(12) United States Patent
Huang

(10) Patent No.: US 12,714,062 B2
(45) Date of Patent: Aug. 25, 2026

(54) FOLDABLE, INSULATED AND IMPACT-RESISTANT ANIMAL CAGE

(71) Applicant: ZHEJIANG KUER INTELLIGENT TECHNOLOGY CO., LTD., Ningbo (CN)

(72) Inventor: Shengli Huang, Ningbo (CN)

( * ) Notice: Subject to any disclaimer, the term of this patent is extended or adjusted under 35 U.S.C. 154(b) by 0 days.

(21) Appl. No.: 19/234,654

(22) Filed: Jun. 11, 2025

(65) Prior Publication Data

US 2025/0302003 A1 Oct. 2, 2025

(30) Foreign Application Priority Data

Mar. 12, 2025 (CN) ......................... 202520432869.7

(51) Int. Cl.
*A01K 1/02* (2006.01)

(52) U.S. Cl.
CPC ................................. *A01K 1/0245* (2013.01)

(58) Field of Classification Search
CPC .................................................... A01K 1/0245
See application file for complete search history.

(56) References Cited

U.S. PATENT DOCUMENTS 3,195,506 A * 7/1965 Beard ...................... B65D 7/26 217/15
4,484,540 A * 11/1984 Yamamoto ........... A01K 1/0245 119/497
4,590,885 A * 5/1986 Sugiura .................. A01K 31/08 119/497
5,669,331 A * 9/1997 Richmond ........... A01K 1/0245 119/497
5,967,090 A * 10/1999 Hui .......................... A01K 1/03 119/497
6,092,488 A * 7/2000 Allawas ............... A01K 1/0245 119/497
6,216,638 B1 * 4/2001 Pivonka ............... A01K 1/0245 119/498
9,815,587 B2 * 11/2017 Matsuoka .............. B65D 11/24
12,070,011 B1 * 8/2024 Van Vleet ............ A01K 1/0035
2005/0145192 A1 * 7/2005 Axelrod ............... A01K 1/0245 119/499
2005/0229866 A1 * 10/2005 Simpson ................ A01K 1/033 119/499
2008/0121188 A1 * 5/2008 Axelrod ................. A01K 1/033 119/499
2014/0202395 A1 * 7/2014 Cantwell .............. A01K 1/0245 119/474
2025/0212832 A1 * 7/2025 Byrne .................. A01K 1/0035
2025/0302003 A1 * 10/2025 Huang ................ A01K 1/0245

* cited by examiner

*Primary Examiner* — Jessica B Wong

(57) ABSTRACT

An animal cage comprises a base and an upper cover, wherein a front side panel, a rear side panel, a left side panel and a right side panel are arranged between the base and the upper cover; the front side panel comprises a first side panel and a second side panel; the rear side panel comprises a third side panel and a fourth side panel; the upper ends of the left side panel and the right side panel are movably connected to the upper cover respectively, and the lower ends are detachably connected to the front side panel and the rear side panel through connecting pieces; the front side panel, the rear side panel, the left side panel and the right side panel can all be folded inwards. The animal cage has the advantages of convenient folding and rapid unfolding.

1 Claim, 11 Drawing Sheets

FOLDABLE, INSULATED AND IMPACT-RESISTANT ANIMAL CAGE

CROSS-REFERENCE TO RELATED APPLICATION

This application claims priority to Chinese Patent Application No. 202520432869.7, filed on Mar. 12, 2025, the disclosure of which is incorporated herein by reference in entirety.

TECHNICAL FIELD

The present disclosure relates to the field of animal tools, and in particular to an animal cage.

BACKGROUND

Animal cages are common in daily life as tools for raising, carrying and transporting animals. The existing animal cages on the market are made of two materials: metal or plastic. Metal cages are heavy, might be easily deformed and damaged during assembly and disassembly, and they are prone to rust. Plastic cages are mostly assembled from single-layer plastic panels, this type of animal cages may break due to thin walls or brittle materials. Although the cage body of this type is light, it lacks strength and has poor impact resistance, making it easy for large dogs to damage it. Furthermore, in order to facilitate the storage, carrying and transportation of animal cages, many foldable animal cages have appeared on the market, but the existing animal cages are not easy to operate when unfolding and folding. Therefore, there is a lot of room for improvement in animal cages.

SUMMARY

The present disclosure provides an animal cage that is light in weight, has a high strength of cage body, can effectively insulate heat and sound, and is easy to fold and unfold. The animal cage is assembled from plastic panels with a double-layer hollow structure on all sides. The double-layer design can increase the strength of the product, so that the overall strength of the animal cage is close to that of a metal cage. It not only has strong impact resistance so that it is not easily destroyed by large dogs and it is also more sturdy and durable, but it is also lighter than a metal cage and easy to carry. Meanwhile, the hollow structure can effectively reduce the transfer of heat and sound to the inside of the animal cage, achieving the purpose of heat insulation and sound insulation. In addition, the animal cage can be quickly folded and unfolded, is easy to operate, and is easy to carry and transport. The present disclosure is achieved through the following technical solutions:

An animal cage, comprising a base and an upper cover, wherein a front side panel, a rear side panel, a left side panel and a right side panel are arranged between the base and the upper cover; the front side panel comprises a first side panel and a second side panel, an upper end of the first side panel is movably connected to the upper cover, a lower end of the first side panel is movably connected to an upper end of the second side panel, and a lower end of the second side panel is movably connected to the base; the rear side panel comprises a third side panel and a fourth side panel, an upper end of the third side panel is movably connected to the upper cover, a lower end of the third side panel is movably connected to an upper end of the fourth side panel, and a lower end of the fourth side panel is movably connected to the base; upper ends of the left side panel and the right side panel are respectively movably connected to the upper cover, and lower ends of the left side panel and the right side panel are detachably connected to the front side panel and the rear side panel through connecting pieces; the front side panel, the rear side panel, the left side panel and the right side panel can all be folded inwards. By adopting the above technical solution, the animal cage can be quickly folded and stored, and when unfolding, only the upper cover needs to be lifted upward, and the left and right side panels can automatically fall and support the cage body, so as to realize the rapid unfolding and folding of the cage body.

According to some embodiments of the present disclosure, the upper cover comprises an upper cover body, the edge of the upper cover body is provided with an upper baffle extending from top to bottom, inner side surfaces of the upper baffle and a lower surface of the upper cover body enclose and form a second accommodating space; the base comprises a base body, the edge of the base body is provided with a lower baffle extending from bottom to top, inner side surfaces of the lower baffle and an upper surface of the base body enclose and form a first accommodating space; the front side panel, the rear side panel, the left side panel and the right side panel are all arranged on the inner sides of the upper baffle and the lower baffle; when a cage body of the animal cage is folded, the left side panel and the right side panel are turned over and folded into the second accommodating space, and the front side panel and the rear side panel are folded between the upper cover and the base and stored in an accommodating space below the left side panel and the right side panel. By adopting the above technical solution, the upper baffle and the lower baffle limit the left side panel and the right side panel, so that the left side panel and the right side panel can quickly reach the specified position when unfolded and be in a vertical state to achieve rapid unfolding. Secondly, the upper baffle and the lower baffle, together with the upper cover body and the base body form side panels that can be used to store the cage body in the folded state, making the design more compact and more beautiful.

According to some embodiments of the present disclosure, a door opening for animals to enter and exit is provided on the right side panel, the door opening is provided with a cage door rotatably connected to the right side panel, and the cage door is provided with a door lock.

According to some embodiments of the present disclosure, the upper cover is provided with a handle. With the above technical solution, when unfolding the cage body, the cage body can be quickly unfolded by simply lifting the handle, which is more convenient to operate, and the handle is also more convenient to carry when transferring the cage body.

According to some embodiments of the present disclosure, front and rear sides of the upper cover are provided with lock buckles, and the base is provided with lock buckle fixing portions at positions corresponding to the lock buckles. With the above technical solution, the upper cover and the base can be quickly locked by the lock buckles after the cage body is folded, which is convenient for transferring and carrying the folded cage body.

According to some embodiments of the present disclosure, the connecting piece is a latch or a button-type automatic spring latch lock. With the above technical solution, when the cage body is unfolded, the left and right side panels can be quickly fixed to the front and rear side panels to achieve rapid unfolding of the cage body.

According to some embodiments of the present disclosure, the animal cage further comprises a limiting member; the limiting member is installed on the base when the cage body is folded, and installed at junctions of the first side panel and the second side panel overlapping the left side panel and the right side panel when the cage body is unfolded, and at junctions of the third side panel and the fourth side panel overlapping the left side panel and the right side panel. By adopting the above technical solution, the limiting member is installed on the unfolded cage body to increase the unfolding strength of the cage body.

According to some embodiments of the present disclosure, the limiting member is a limiting bolt or an angle iron.

According to some embodiments of the present disclosure, all or some of the base, upper cover, left side panel, right side panel, front side panel and rear side panel comprise an inner layer panel and an outer layer panel, with a hollow layer formed between the inner layer panel and the outer layer panel. With the above technical solution, all surfaces of the cage body are made of splicing panels with double-layer hollow structure, or some of the surfaces are made of splicing panels with double-layer hollow structure. Although the splicing panel on each surface is made of plastic, the design of double-layer structure can make the cage body reach a strength close to that of a metal cage, increase the impact resistance of the cage body, and not be easily damaged by large dogs; and it is lighter than a metal cage and easy to carry. The design of hollow structure (there is a hollow layer between the inner and outer panels) can effectively reduce the transfer of heat and sound to the inside of the animal cage, and the design of double-layer hollow can also include an embedded buffer layer.

Figure 1:
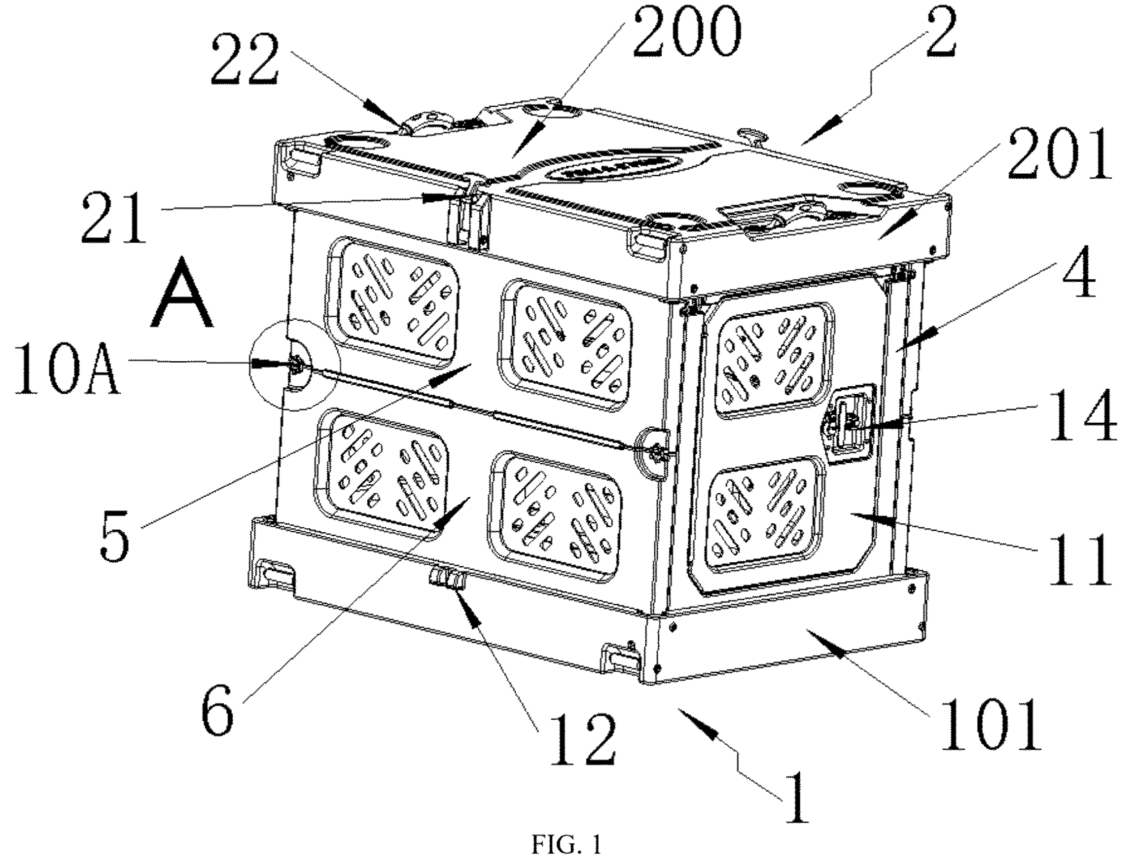
FIG. 1 is a right front side perspective view of an animal cage of the present disclosure.

In the figures: 1. base; 2. upper cover; 3. left side panel; 4. right side panel; 5. first side panel; 6. second side panel; 7. third side panel; 8. fourth side panel; 9. connecting piece; 10. limiting member; 11. cage door; 12. lock buckle fixing portion; 13. light-transmitting and air-permeable hole; 14. door lock; 15. stacking slot; 16. anti-slip foot pad; 17. slot; 21. lock buckle; 22. handle; 10A. limiting bolt; 10B. angle iron; 100. base body; 101. lower baffle; 200. upper cover body; 201. upper baffle; 110. first connecting hole; 220. second connecting hole.

DETAILED DESCRIPTION OF EMBODIMENTS

The technical solutions of the present disclosure will be further described below through embodiments with reference to the accompanying drawings. It should be noted that the following embodiments are used to help understand the present disclosure, but do not constitute a limitation of the present disclosure.

In the description of the present application, it should be understood that the terms “upper”, “lower”, “front”, “rear”, “left”, “right”, “upper end”, “lower end”, “left end”, “right end”, “front end”, “rear end”, “left side”, “right side”, “inner”, “outer”, “inside”, “outside” and the like indicate directional or positional relationships based on the directions and positions shown in the drawings; they are only for the convenience of describing the present application and simplifying the description, and do not indicate or imply that the device or element referred to must have a specific orientation, be constructed and operated in a specific orientation, and therefore cannot be understood as a limitation on the present application. In addition, in the description of the present application, “inner side surface” and “outer side surface” are both relative to the inside and outside of the complete cage.

Figure 2:
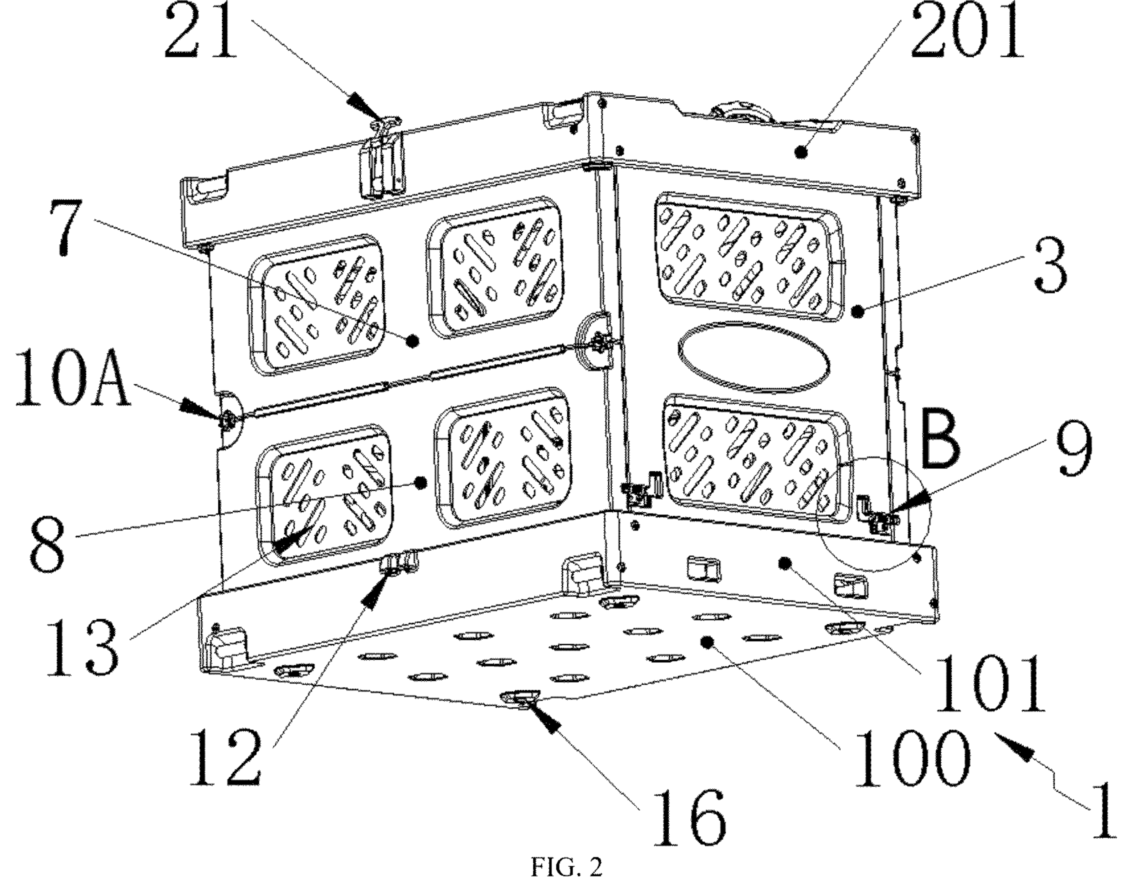
FIG. 2 is a left rear side perspective view of the animal cage of the present disclosure.

Referring to FIGS. 1-2, an animal cage provided by the present disclosure includes a base 1 and an upper cover 2 which are arranged opposite to each other in an upper and lower direction. The base 1 and the upper cover 2 are rectangular. The rectangular base 1 includes a base body 100. The four sides/edges of the base body 100 are provided with lower baffles 101 extending vertically upward. The inner side surfaces of the lower baffles 101 and the upper surface of the base body 100 form a first accommodating space; the rectangular upper cover 2 includes an upper cover body 200. The four sides/edges of the upper cover body 200 are provided with upper baffles 201 extending vertically downward. The inner side surfaces of the upper baffles 201 and the lower surface of the upper cover body 200 form a second accommodating space. A front side panel and a rear side panel standing opposite to each other, and a left side panel 3 and a right side panel 4 standing opposite to each other are provided between the base 1 and the upper cover 2; the front side panel, the rear side panel, the left side panel 3 and the right side panel 4 are all arranged on the inner sides of the upper baffles 201 and the lower baffles 101, and the upper cover 2, the base 1 and the front side panel, the rear side panel, the left side panel 3 and the right side panel together form an activity space for the animal.

In order to facilitate the storage and transfer of the animal cage, the front and rear side panels and the left and right side panels are all configured to be foldable into the space enclosed by the base 1 and the upper cover 2. Specifically, as shown in FIG. 1, the front side panel includes a first side panel 5 and a second side panel 6, the upper end of the first side panel 5 is movably connected to the upper cover 2, the lower end of the first side panel 5 is movably connected to the upper end of the second side panel 6, and the lower end of the second side panel 6 is movably connected to the base 1; similarly, as shown in FIG. 2, the rear side panel includes a third side panel 7 and a fourth side panel 8, the upper end of the third side panel 7 is movably connected to the upper cover 2, the lower end of the third side panel 7 is movably connected to the upper end of the fourth side panel 8, and the lower end of the fourth side panel 8 is movably connected to the base 1.

Figure 3:
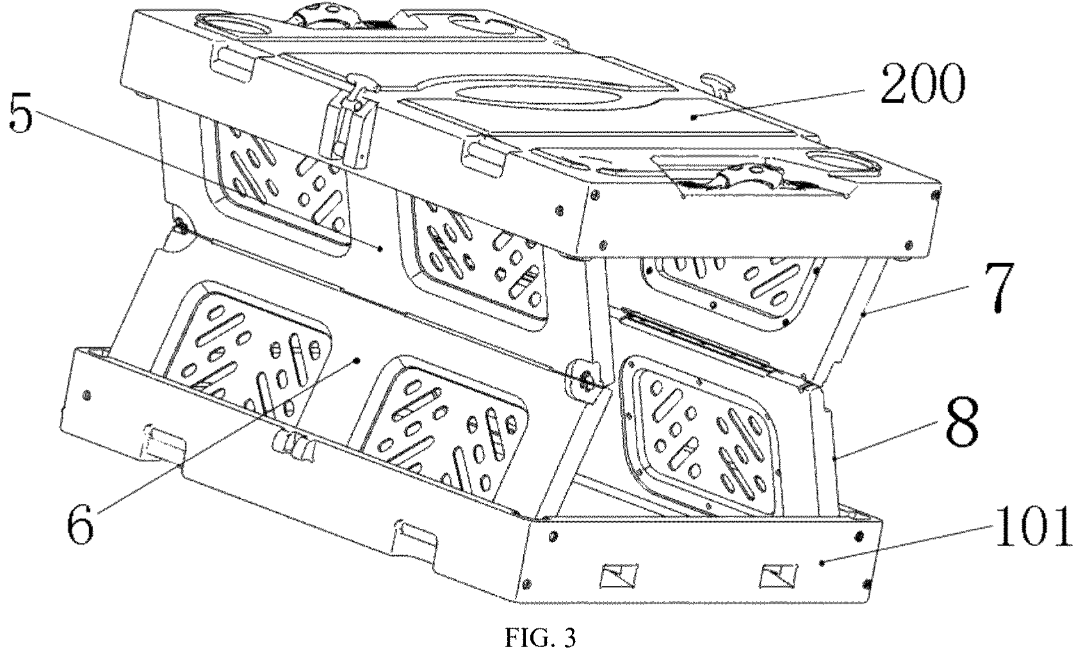
FIG. 3 is a perspective view of the animal cage of the present disclosure in a semi-folded state.

In this embodiment, as shown in FIGS. 1 and 3, the upper end of the first side panel 5 is movably connected to the upper cover 2 via a cylindrical pin, and the first side panel 5 can rotate toward the lower surface of the upper cover 2 along the axis of the cylindrical pin; the lower end of the second side panel 6 is movably connected to the base 1 via a cylindrical pin; the lower end of the first side panel 5 and the upper end of the second side panel 6 are movably connected via a hinge. After the installation is completed, the first side panel 5 and the second side panel 6 can rotate relative to each other along the axis of the hinge, the first side panel 5 can be flipped/turned over toward the lower surface of the upper cover 2, and the second side panel 6 can be flipped/turned over toward the upper surface of the base 1.

Similarly, as shown in FIGS. 2 and 3, the upper end of the third side panel 7 is movably connected to the upper cover 2 via a cylindrical pin, the lower end of the fourth side panel 8 is movably connected to the base 1 via a cylindrical pin, and the lower end of the third side panel 7 is movably connected to the upper end of the fourth side panel 8 via a hinge. After the installation is completed, the third side panel 7 and the fourth side panel 8 can rotate relative to each other along the axis of the hinge, the third side panel 7 can be flipped/turned over toward the lower surface of the upper cover 2, and the fourth side panel 8 can be flipped/turned over toward the upper surface of the base 1.

Figure 8:
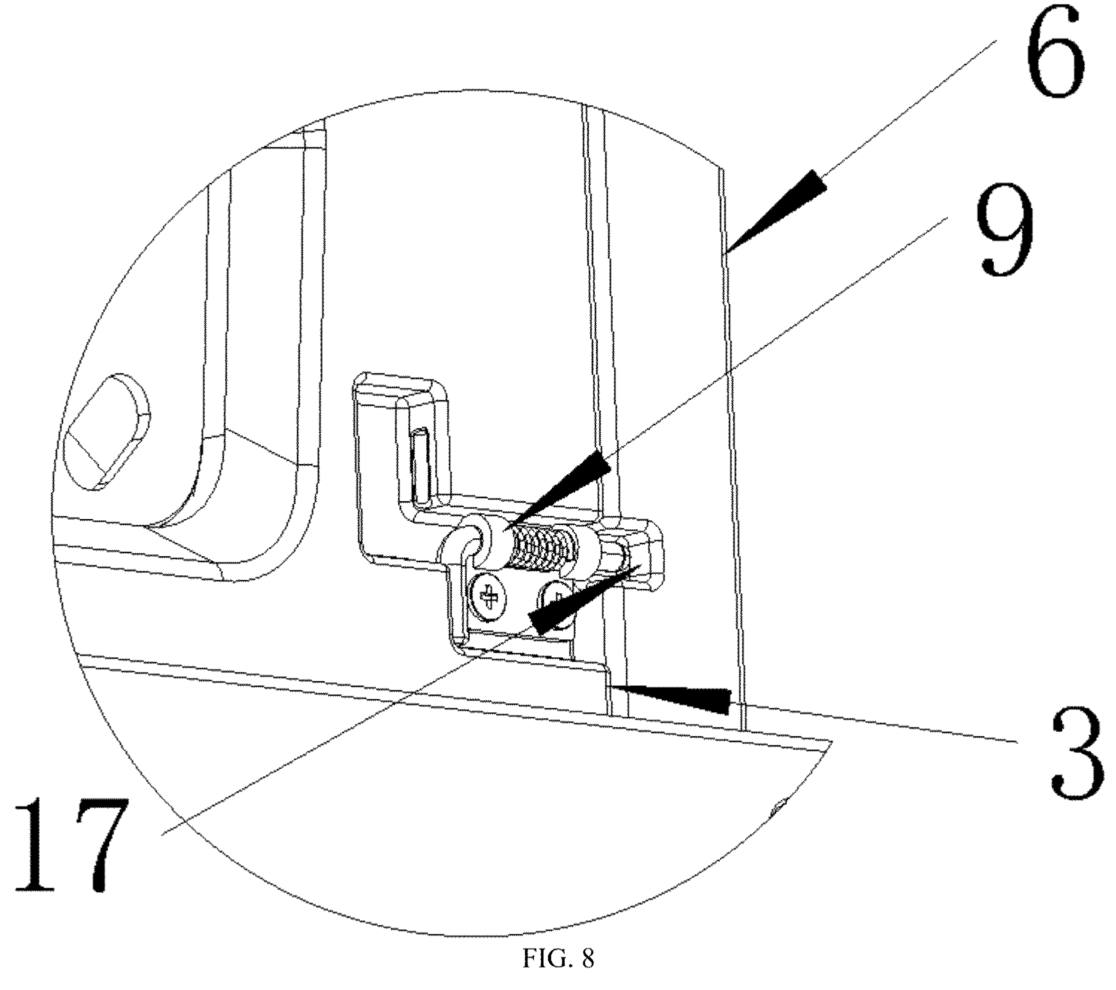
FIG. 8 is a partial enlarged view of portion B in FIG. 2.

In order to facilitate folding, storage and rapid unfolding, the upper ends of the left side panel 3 and the right side panel 4 are movably connected to the upper cover 2, and the lower ends are detachably connected to the front side panel and the rear side panel through connecting pieces 9. In this embodiment, the upper ends of the left side panel 3 and the right side panel 4 are movably connected to the upper cover 2 through cylindrical pins, and the connecting piece 9 is a latch. As shown in FIGS. 2 and 8, the left and right sides of the second side panel 6 and the fourth side panel 8 are provided with slots 17 for the plug of the latch to extend into, at the positions near the lower baffle 101, and the left side panel 3 and the right side panel 4 are installed with latches at positions corresponding to the slots 17; the left side panel 3 and the right side panel 4 are locked with the front side panel and the rear side panel by pushing the plug (latch) into the slot 17; the left side panel 3 and the right side panel 4 are unlocked with the front side panel and the rear side panel by pushing and pulling the plug (latch) away from the slot 17.

The connecting piece 9 can adopt a manual latch or a button-type automatic spring latch lock. In the case where the button-type automatic spring latch lock is adopted, when the left side panel 3 and the right side panel are unlocked from the front side panel and the rear side panel, the plug is always kept in a retracted state to prevent the plug from extending and causing the left and right side panels to contact with the front and rear side panels during the falling process and cause jamming, thus the left and right side panels can fall more reliably and smoothly when unfolded.

A door opening for animals to enter and exit is provided on the right side panel 4, and a cage door 11 is provided on the door opening and is rotatably connected to the right side panel 4 through a hinge. A door lock 14 is provided at one end of the cage door 11 away from the hinge. After the animal enters the cage, the cage door 11 and the right side panel 4 are locked and fixed by the door lock 14, so that the animal is locked in the cage, restricting the entry and exit of the animal in the cage.

Furthermore, in order to facilitate observation of the animals in the cage, ensure that the light in the cage is not too dark and that the animals breathe normally, the animal cage adopts a multi-faceted ventilation design, and windows are provided on the front side panel, the rear side panel, the left side panel 3 and the cage door 11, and light-transmitting and air-permeable holes 13 are provided on the windows.

Figure 4:
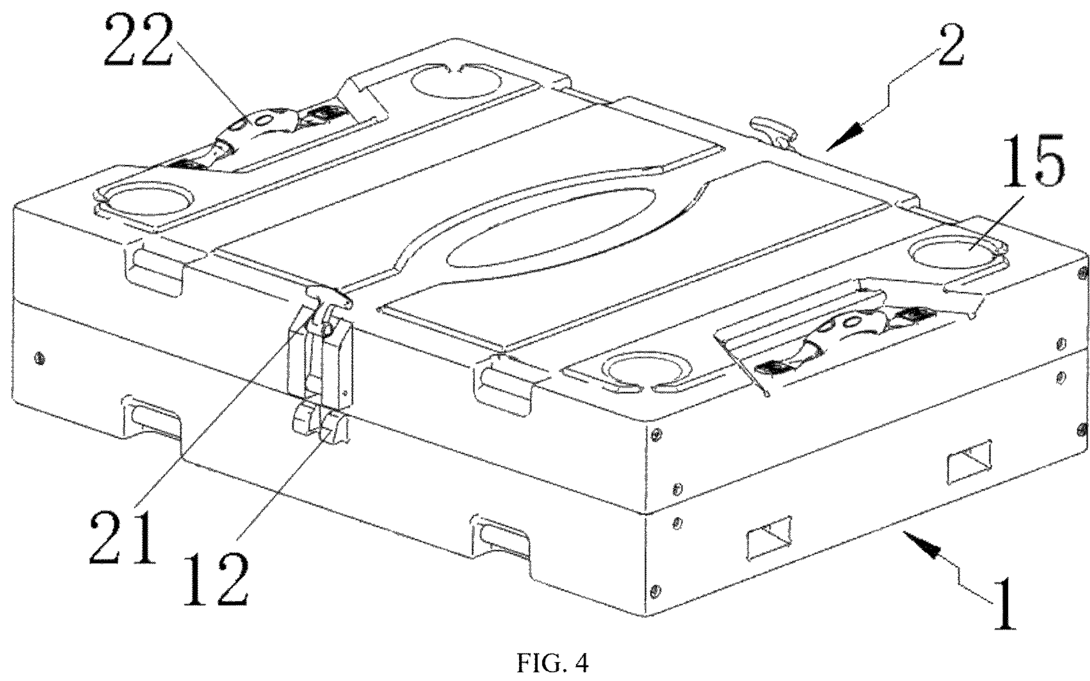
FIG. 4 is a perspective view of the animal cage of the present disclosure in a fully folded state.

As shown in FIGS. 1-4, when the animal cage needs to be folded from the unfolded state shown in FIG. 1 to the folded state shown in FIG. 4, first, the plugs of the latches at the lower ends of the left side panel 3 and the right side panel 4 are removed from the slots 17; then the left side panel 3 and the right side panel 4 are turned over and folded toward the lower surface of the upper cover 2, and finally stored in the second accommodating space of the upper cover 2, and then the left side panel 3 and the right side panel 4 are supported to make the upper cover 2 containing the left side panel 3 and the right side panel 4 fall vertically, and the lower baffle 101 and the upper baffle 201 that were originally far away from each other gradually approach each other, and at the same time, the front side panel and the rear side panel are also folded into the cage body. Specifically, the first side panel 5 and the third side panel 7 are flipped over and stored toward the lower surface of the upper cover 2, and the second side panel 6 and the fourth side panel 8 are flipped over and stored toward the upper surface of the base 1. After complete folding, the lower surface of the upper baffle 201 contacts the upper surface of the lower baffle 101, and the first side panel 5, the second side panel 6, the third side panel 7 and the fourth side panel 8 are stored in the accommodating space below the left side panel 3 and the right side panel 4 (the accommodating space below the left side panel 3 and the right side panel 4 includes the first accommodating space and part of the second accommodating space below the left side panel and the right side panel).

In order to lock the cage body after folding for easy carrying and transport, lock buckles 21 are provided on the front and rear sides of the upper cover 2. Preferably, the lock buckles 21 are provided on the upper baffles 201, and lock buckle fixing portions 12 are provided on the lower baffles 101 of the base 1 at positions corresponding to the lock buckles 21. After the cage body is folded, the lock buckles 21 on the front and rear sides of the upper cover 2 are turned down and fixed in the lock buckle fixing portions 12 of the base 1, so that the cage body after folding is locked.

In order to facilitate the unfolding of the cage body, the outer surface of the upper cover body 200 is provided with a handle 22, which can be arranged in the middle of the upper cover body, or at the left, right, front, and rear ends of the upper cover body 200. In order to facilitate the stacking of animal cages, the upper cover body 200 is provided with a groove at the position of the handle to hide the handle 22.

When the animal cage needs to be unfolded from the folded state shown in FIG. 4 to the unfolded state shown in FIG. 1, it is only necessary to flip the lock buckle 21 upwards to unlock the upper cover 2 and the base 1, and then pull the handle 22 upwards to unfold the front and rear side panels to a state perpendicular to the upper cover 2 and the base 1, and the left and right side panels 3 and 4 automatically fall down. Due to the limitation of the lower baffles 101, the left and right side panels 3 and 4 can fall freely and quickly and be in an upright state perpendicular to the upper cover 2 and the base 1, thereby supporting the cage body. Finally, the plugs of the latches are inserted into the slots 17 on the left and right sides of the front and rear side panels to fix the left and right side panels to the front and rear side panels, so as to achieve the purpose of quickly and smoothly unfolding the cage body by just lifting the handle 22.

In order to enhance the unfolding strength of the cage body, limiting members 10 are provided at the junctions of the first side panel 5 and the second side panel 6 overlapping the left and right side panels, and at the junctions of the third side panel 7 and the fourth side panel 8 overlapping the left and right side panels.

Figure 5:
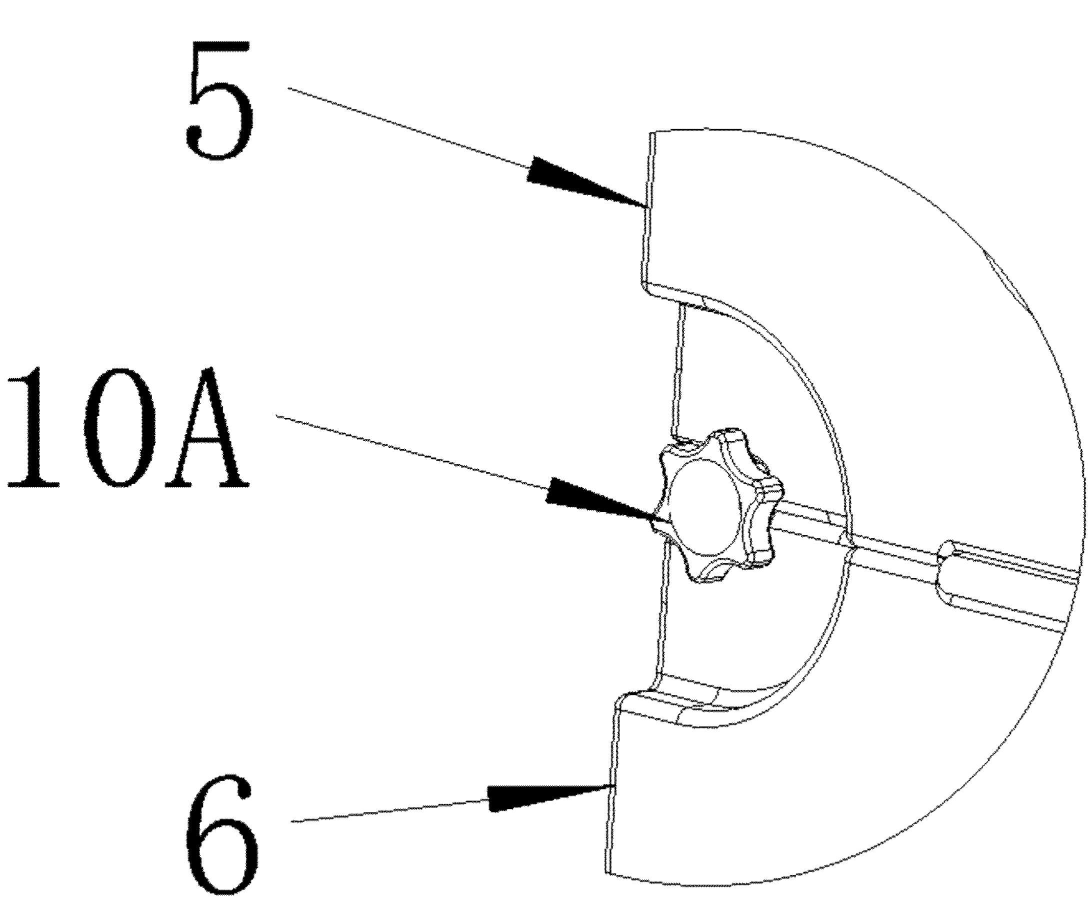
FIG. 5 is a partial enlarged view of portion A in FIG. 1.
Figure 6:
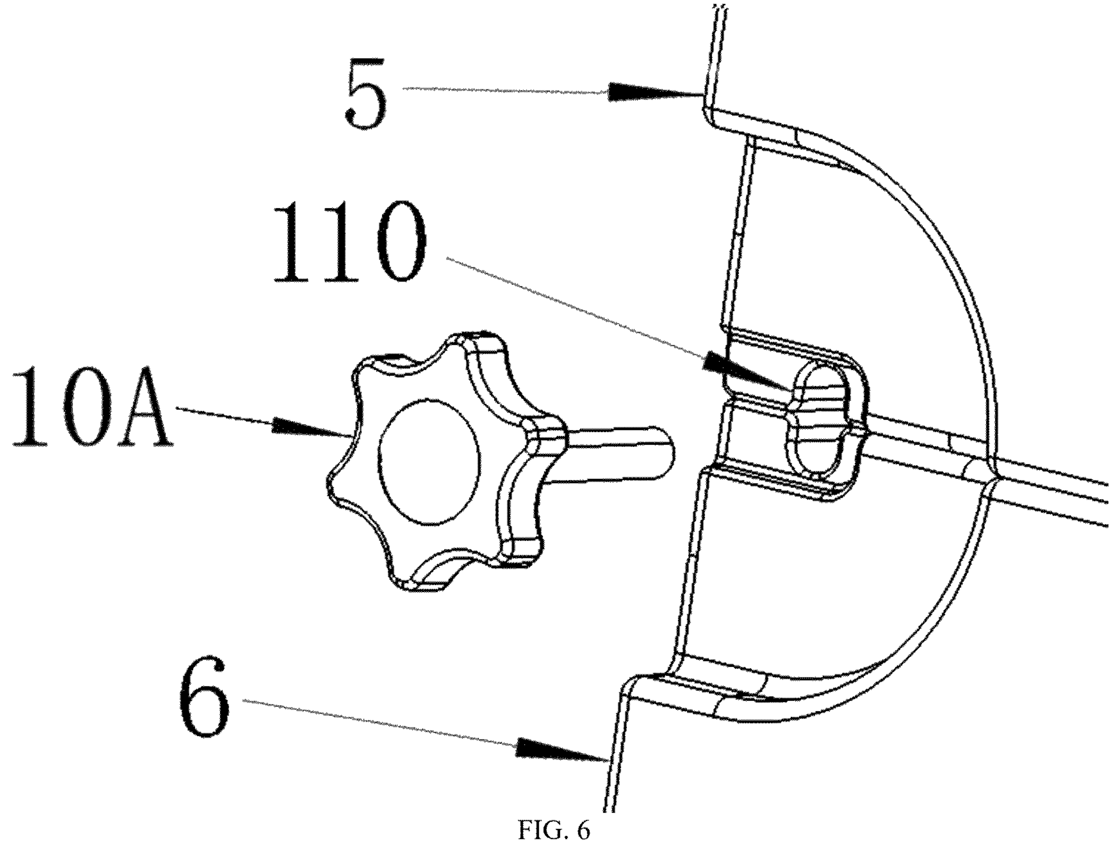
FIG. 6 is a schematic view showing the pre-connection between the limiting bolt and the cage body shown in FIG. 5.

As an embodiment, the limiting member 10 can be a limiting bolt 10A, as shown in FIGS. 1, 5, and 6, the lower left corner and the lower right corner of the first side panel 5 are respectively provided with a semicircular through hole that concaves upward from the lower end of the first side panel 5, and the upper left corner and the upper right corner of the second side panel 6 are respectively provided with a semicircular through hole that concaves downward from the upper end of the second side panel 6, and the position of the semicircular through hole of the first side panel 5 corresponds to the position of the semicircular through hole of the second side panel 6 and they are communicated with each other to form a first connecting hole 110; blind holes with internal thread are opened in the front-to-back direction at the positions corresponding to the first connecting holes 110 on the left side panel 3 and the right side panel 4. When the cage body is unfolded, the screw of the limiting bolt 10A is screwed into the blind hole through the first connecting hole 110, and the first side panel 5, the second side panel 6, the left side panel 3, and the right side panel 4 are further fixed and limited, so that the strength of the cage body in the unfolded state is higher. The installation of the limiting bolts of the third side panel 7 and the fourth side panel 8 is the same as above, and will not be repeated here.

Figure 7:
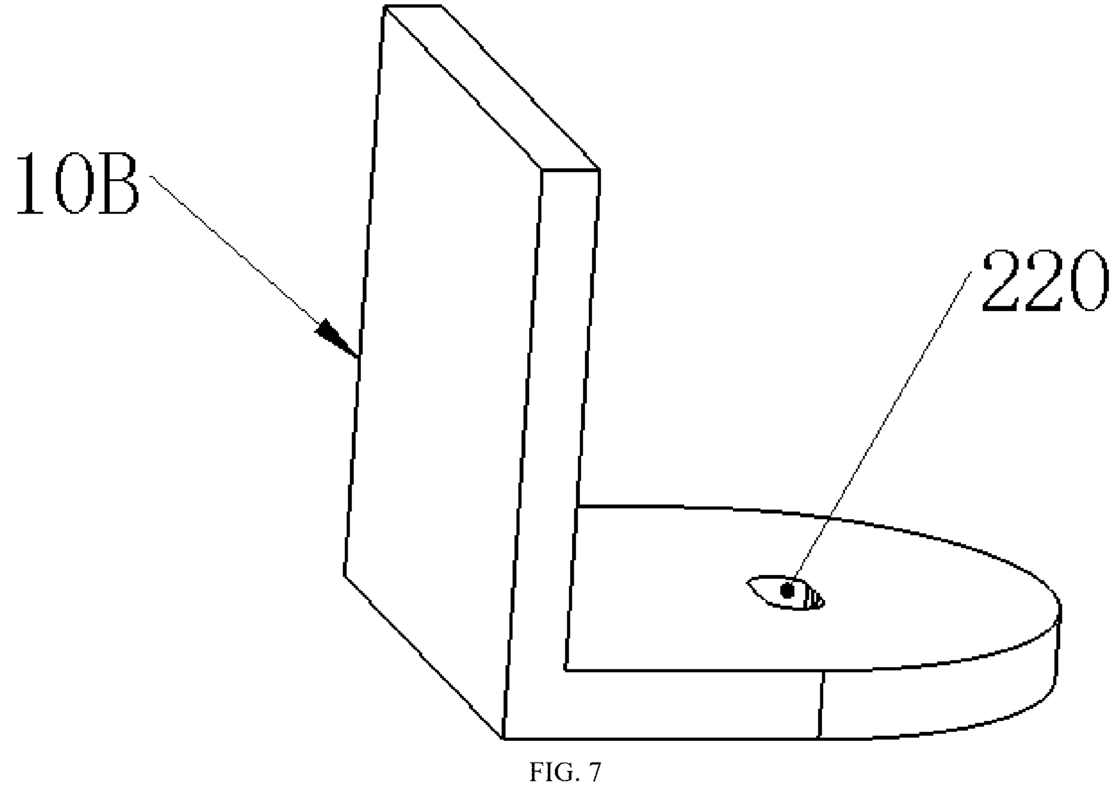
FIG. 7 is a perspective view of an angle iron.

As another embodiment, the limiting member 10 can adopt an angle iron 10B, as shown in FIG. 7, the angle iron 10B is an L-shaped angle iron, and a second connecting hole 220 is opened on the L-shaped angle iron at a position corresponding to the first connecting hole 110. When the cage body is unfolded, the second connecting hole 220 of the L-shaped angle iron 10B is aligned with the first connecting hole 110, and the L-shaped angle iron is installed by screws on the corner formed by the adjacent part of the first side panel 5 and the second side panel 6, and the left and right side panels, and on the corner formed by the adjacent part of the third side panel 7 and the fourth side panel 8, and the left and right side panels, so that the cage body is more stable and reliable after being unfolded, and the unfolding strength of the cage body is increased.

Furthermore, in order to facilitate the folding of the cage body and prevent the limiting member 10 from being lost, a mounting hole for fixing the limiting member 10 can be opened on the upper baffle 201 or the lower baffle 101. When the cage body needs to be folded, the limiting member 10 can be removed from the unfolded cage body and installed on the upper baffle 201 or the lower baffle 101.

In addition, as shown in FIG. 2 and FIG. 4, anti-slip foot pads 16 are provided at the four corners of the lower surface of the base body 100, and stacking grooves 15 are provided at the four corners of the upper surface of the upper cover body 200. When the animal cages are stacked up and down, the anti-slip foot pads 16 on the lower surface of the upper animal cage can be placed in the stacking grooves 15 on the upper surface of the lower animal cage, so that the stacked animal cages are more stable and not easy to collapse.

Figure 9:
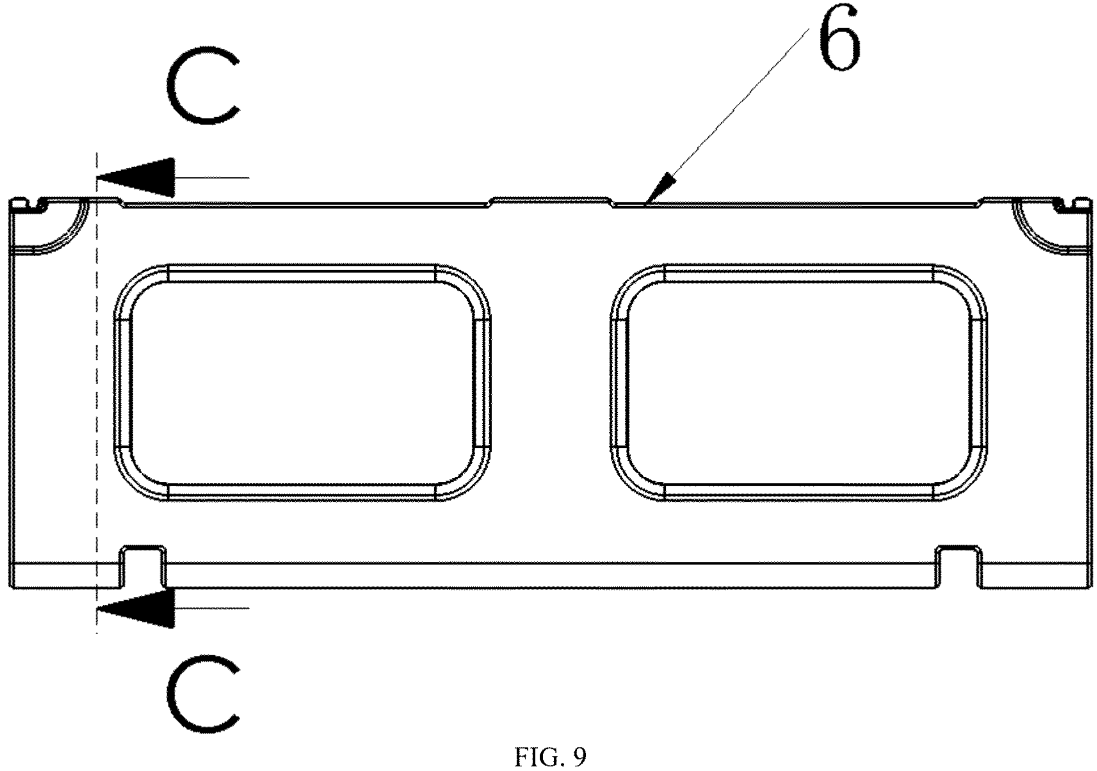
FIG. 9 is a front view of the second side panel.
Figure 10:
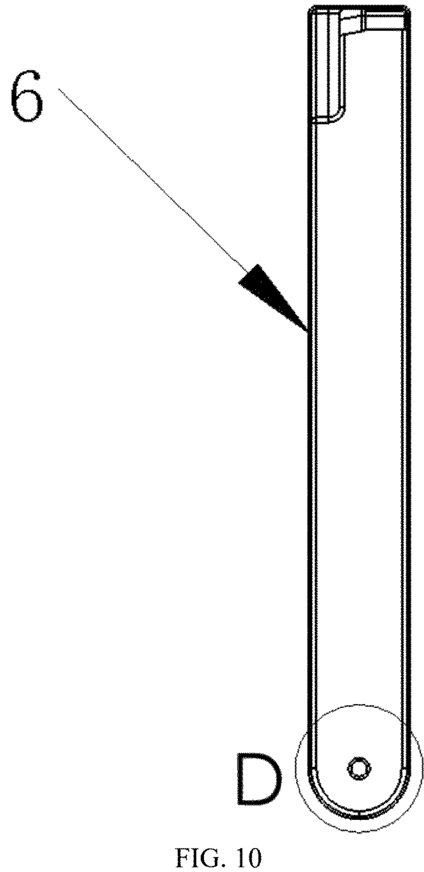
FIG. 10 is a cross-sectional view taken along the C-C direction in FIG. 9.
Figure 11:
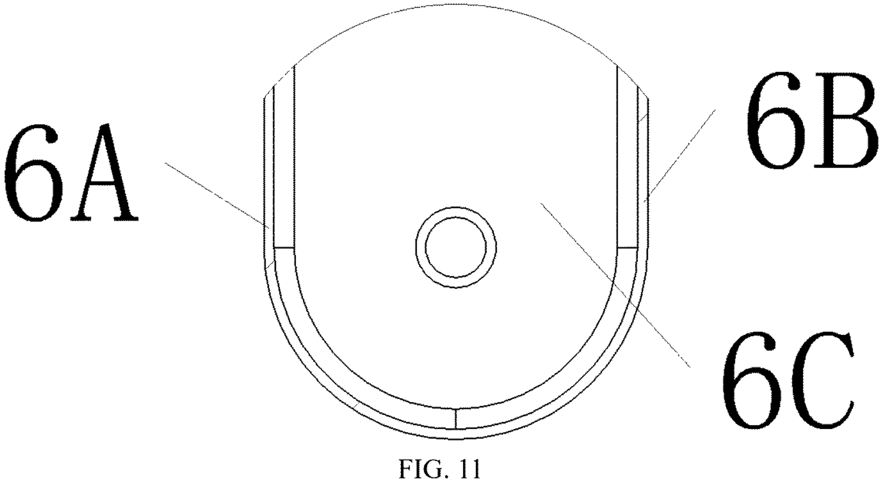
FIG. 11 is a partial enlarged view of portion D in FIG. 10.

Ordinary animal cages are assembled by single-layer plastic panels. Although the cage body of this kind is light, the cage body is not strong enough and has poor impact resistance. They are easy to be damaged by large dogs. If the design is improper, it may be broken due to thin walls or brittle materials. In this embodiment, as shown in FIGS. 9-11, the base 1, the upper cover 2, the left side panel 3, the right side panel 4, the first side panel 5, the second side panel 6, the third side panel 7, the fourth side panel 8, and the cage door 11 (not shown) are all made of plastic panels with a double-layer hollow structure. The double-layer hollow structure means that each of the above panels includes an inner panel and an outer panel, and there is a hollow layer between the inner panel and the outer panel; FIG. 11 is a partial enlarged view of the cross-sectional view of the second side panel 6. Taking the second side panel 6 as an example, the second side panel 6 includes an outer panel 6A and an inner panel 6B, and there is a hollow layer 6C between the outer panel 6A and the inner panel 6B.

Of course, in other embodiments, some of the base 1, upper cover 2, left side panel 3, right side panel 4, first side panel 5, second side panel 6, third side panel 7, fourth side panel 8, and cage door 11 (not shown) are made of plastic panels with a double-layer hollow structure, while the other plates may not use this structure.

The animal cage is assembled from plastic panels with double-layer hollow structure. The double-layer design can increase the strength of the animal cage, make the overall strength of the animal cage close to that of a metal cage. It has strong impact resistance and is not easily damaged by large dogs. It is more sturdy and durable, and is lighter than a metal cage, making it easier to carry and transport. The double-layer hollow structure can effectively reduce the transfer of heat and sound into the animal cage, achieving the purpose of heat insulation and sound insulation. At the same time, the double-layer hollow design can also include an embedded buffer layer.

The above are only preferred embodiments of the present disclosure, and the protection scope of the present disclosure is not limited to the above embodiments. All technical solutions under the concept of the present disclosure belong to the protection scope of the present disclosure. It should be pointed out that for ordinary technicians in this technical field, equivalent changes and several improvements and modifications made without departing from the principle of the present disclosure are all within the protection scope of the present disclosure.

What is claimed is:

1. An animal cage, comprising a base (1) and an upper cover (2), wherein:

a front side panel, a rear side panel, a left side panel (3) and a right side panel (4) are arranged between the base (1) and the upper cover (2);

the front side panel comprises a first side panel (5) and a second side panel (6), an upper end of the first side panel (5) is movably connected to the upper cover (2), a lower end of the first side panel (5) is movably connected to an upper end of the second side panel (6), and a lower end of the second side panel (6) is movably connected to the base (1);

the rear side panel comprises a third side panel (7) and a fourth side panel (8), an upper end of the third side panel (7) is movably connected to the upper cover (2), a lower end of the third side panel (7) is movably connected to an upper end of the fourth side panel (8), and a lower end of the fourth side panel (8) is movably connected to the base (1);

upper ends of the left side panel (3) and the right side panel (4) are respectively movably connected to the upper cover (2), and lower ends of the left side panel (3) and the right side panel (4) are detachably connected to the front side panel and the rear side panel through connecting pieces (9);

the front side panel, the rear side panel, the left side panel (3) and the right side panel (4) can all be folded inward;

wherein the upper cover (2) comprises an upper cover body (200), the edge of the upper cover body (200) is provided with an upper baffle (201) extending from top to bottom, inner side surfaces of the upper baffle (201)

and a lower surface of the upper cover body (200) enclose and form a second accommodating space;

the base (1) comprises a base body (100), the edge of the base body (100) is provided with a lower baffle (101) extending from bottom to top, inner side surfaces of the lower baffle (101) and an upper surface of the base body (100) enclose and form a first accommodating space; the front side panel, the rear side panel, the left side panel (3) and the right side panel (4) are all arranged on the inner sides of the upper baffle (201) and the lower baffle (101);

when a cage body of the animal cage is folded, the left side panel (3) and the right side panel (4) are turned over and folded into the second accommodating space, and the front side panel and the rear side panel are folded between the upper cover (2) and the base (1) and stored in an accommodating space below the left side panel (3) and the right side panel (4);

wherein a door opening for animals to enter and exit is provided on the right side panel (4), the door opening is provided with a cage door (11) rotatably connected to the right side panel (4), and the cage door (11) is provided with a door lock (14);

wherein the upper cover (2) is provided with a handle (22);

wherein front and rear sides of the upper cover (2) are provided with lock buckles (21), and the base (1) is provided with lock buckle fixing portions (12) at positions corresponding to the lock buckles (21);

wherein the connecting piece (9) is a latch or a button-type automatic spring latch lock;

wherein the animal cage further comprises a limiting member (10); the limiting member (10) is installed at junctions of the first side panel (5) and the second side panel (6) overlapping the left side panel (3) and the right side panel (4) when the cage body is unfolded, and at junctions of the third side panel (7) and the fourth side panel (8) overlapping the left side panel (3) and the right side panel (4);

wherein the limiting member (10) is a limiting bolt or an angle iron;

wherein all or some of the base (1), upper cover (2), left side panel (3), right side panel (4), front side panel and rear side panel comprise an inner layer panel and an outer layer panel, with a hollow layer formed between the inner layer panel and the outer layer panel.

* * * * *